(12) United States Patent
Womack

(10) Patent No.: US 8,196,976 B2
(45) Date of Patent: Jun. 12, 2012

(54) CHAIN HOOK

(76) Inventor: John Christopher Womack, Nocona, TX (US)

( * ) Notice: Subject to any disclaimer, the term of this patent is extended or adjusted under 35 U.S.C. 154(b) by 641 days.

(21) Appl. No.: 12/288,703

(22) Filed: Oct. 21, 2008

(65) Prior Publication Data

US 2010/0098485 A1 Apr. 22, 2010

(51) Int. Cl.
*E05C 17/36* (2006.01)
*E05C 17/00* (2006.01)

(52) U.S. Cl. ............ 292/264; 24/116 A; 24/116 R

(58) Field of Classification Search ........ 292/246, 292/264; 24/116 A, 116 R
See application file for complete search history.

(56) References Cited

U.S. PATENT DOCUMENTS

| 1,325,538 A | | 12/1919 | Smith | |
|---|---|---|---|---|
| 2,790,663 A | * | 4/1957 | Sarver | 292/264 |
| 2,908,529 A | * | 10/1959 | Davidson | 296/56 |
| 3,720,431 A | | 3/1973 | Oliver et al. | |
| D241,506 S | * | 9/1976 | Condos | D8/344 |
| D241,507 S | * | 9/1976 | Condos | D8/344 |
| 4,254,975 A | | 3/1981 | Miller | |
| 4,560,191 A | | 12/1985 | Grassi | |
| 5,716,084 A | * | 2/1998 | Sanford et al. | 292/264 |
| 5,724,804 A | * | 3/1998 | Smetz | 59/93 |
| 7,000,292 B2 | | 2/2006 | Beaudoin et al. | |
| 7,185,880 B1 | * | 3/2007 | McCray | 254/30 |
| 7,503,102 B2 | * | 3/2009 | Hsieh | 24/116 R |
| 2002/0112463 A1 | * | 8/2002 | Smetz | 59/93 |
| 2006/0267352 A1 | * | 11/2006 | Childress | 292/246 |

* cited by examiner

*Primary Examiner* — Carlos Lugo

(74) *Attorney, Agent, or Firm* — Lynn E. Barber

(57) ABSTRACT

A chain hook having a landing area above a mouth of a slot for easy placement of a chain link in the slot so that a gate or door may be detachably held to a support. The chain hook also has a lock hole so that the chain may be padlocked to the chain hook.

2 Claims, 4 Drawing Sheets

CHAIN HOOK

BACKGROUND OF THE INVENTION

1. Field of the Invention

This invention relates to gate and door fasteners and chain hooks and latches that allow a section of chain to detachably secure a gate or door in a closed position.

2. Description of the Related Art

There are numerous models of chain hooks and latches that allow a section of chain to detachably secure a gate or door in a closed position. Prior chain hooks and latches generally require that a link of the section of chain be deliberately placed in a slot on the device so that the door or gate may be held closed. Slots on the prior devices generally are rectangular and extend at an angle, generally not perpendicular, to one straight side of a plate. At the position where the sides of the slots meet the side of the plate, there is usually an abrupt untapered corner or a slight beveled area where the link of the chain enters the slot. The shape of the prior devices usually does not allow for a user to hurriedly but securely lock a gate by tossing a chain toward the device as the slot opening is not structured for such a use.

Examples of prior devices used to enable latching of a door or gate with a chain include the following. The gate fastening of Smith (U.S. Pat. No. 1,325,538) is a plate adapted to be fastened to a gate, door or door frame. The plate has an upstanding hook provided with an angularly disposed slot having parallel sides, into which slot a link of chain may be placed to lock the gate. A hasp located below the hook allows a padlock to be used to lock the chain from moving.

Oliver et al. (U.S. Pat. No. 3,720,431) provides a latch plate that may be mounted on a farm gate. The latch plate has a partially inverted T-shaped slot that has beveled portions opening on to an angle edge of the plate. The cross-leg of the T-shaped slot has different length halves.

The chain and hook lock of Condos (U.S. Des. Pat. No. 241,506) includes two perpendicular plates, one of which has a generally linear slot extending into the plate at an acute angle from a slightly wider opening on a side of the plate.

The gate latch apparatus of Miller (U.S. Pat. No. 4,254,975) includes a chain and a cooperating latch plate assembly having an L-shaped receiving slot and a gravity operating keeper to hold the chain link in the slot.

The door security device of Grassi (U.S. Pat. No. 4,560,191) includes a U-shaped chain engaging bracket formed by two legs and a saddle. There are slots perpendicular to the upper and lower edges of one of the legs as well as on the saddle, while the first leg attaches to a support.

The chain keeper of Beudoin et al. (U.S. Pat. No. 7,000,292) includes a support bracket from which project two plates. A slot is formed where the two plates converge toward each other at the bottom of the support bracket. Holes in the chain keeper are provided for receiving a padlock and for attaching the support bracket to a fixed structure.

It is therefore an object of the invention herein to provide a chain hook device having a slot formed so that a user may simply toss a chain at the device and obtain a secure latching of a gate or door.

Other objects and advantages will be more fully apparent from the following disclosure and appended claims.

SUMMARY OF THE INVENTION

The invention herein is a chain hook having a landing area above a mouth of a slot for easy placement of a chain link in the slot so that a gate or door may be detachably held to a support. The chain hook also has a lock hole so that the chain may be padlocked to the chain hook. The chain hook has a secondary slot to further secure the chain.

Other objects and features of the invention will be more fully apparent from the following disclosure and appended claims.

DETAILED DESCRIPTION OF THE INVENTION AND PREFERRED EMBODIMENTS THEREOF

The present invention is a chain hook having a landing area above a mouth of a slot for easy placement of a chain link in the slot so that a gate or door may be detachably held to a support. The chain hook also has a second chain holding area and a lock hole so that the chain may be padlocked to the chain hook.

As used herein the word "post" refers to any generally vertical piece, edge or support to which a chain hook may be attached according to the invention herein. The words "upper", "lower", "above", "below" and the like refer to relative locations on the chain hook of the invention and its use, when the chain hook is mounted in position for use on a post.

Referring now to the Figures showing the invention, the chain hook of the invention for detachably holding a chain to a gate 21 or post or other structure comprises a vertically disposed flat plate 10. The plate is preferably made of mild steel or tempered steel, having a thickness of ¼ to ½ inch. 5/16-inch links are normally used for outdoor gates for livestock, or for extreme livestock handling facilities, ½-inch chain would normally be used. A plate being about 6 inches long and about 2¼ inches wide is satisfactory. Adjustments in plate dimensions may be made using ordinary skill in the art for different sizes of chains or for different uses.

Figure 4:
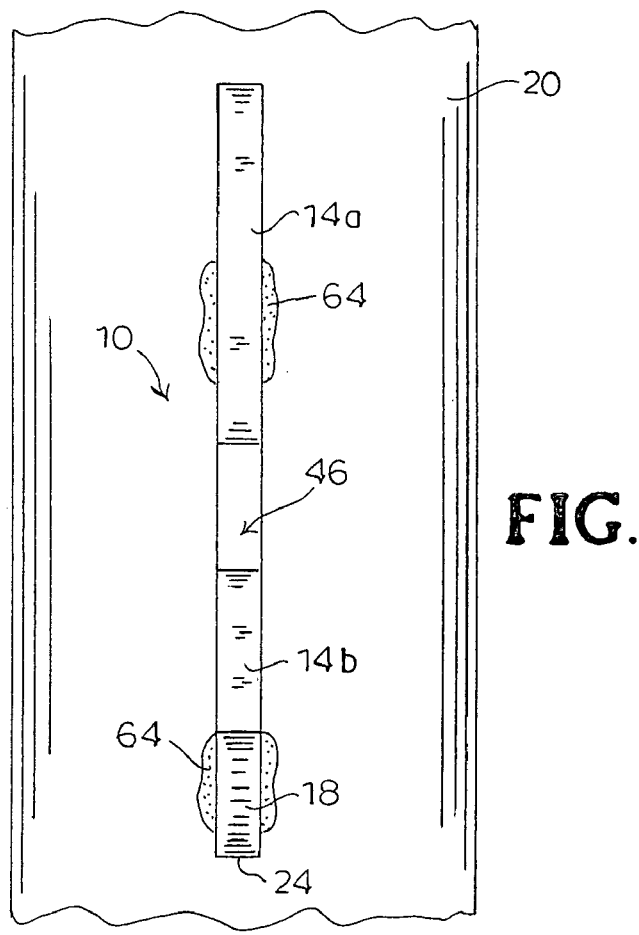
FIG. 4 is a side view of the outside edge of the chain hook of the invention when mounted on a post.
Figure 5:
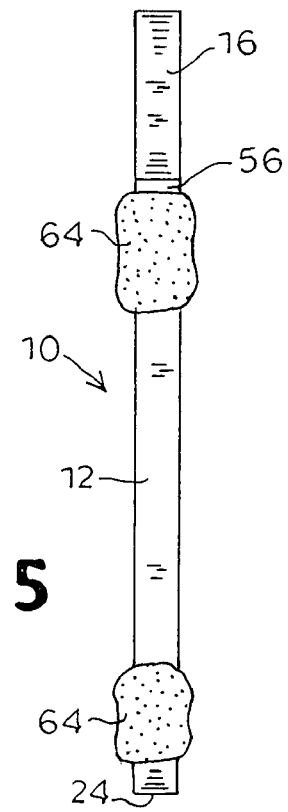
FIG. 5 is a side view of the inside edge of the chain hook of the invention before mounting on a post showing the areas where it is preferably welded to a post.

The plate 10 is basically rectangular with certain important deviations from rectangular as described herein. The four main outer edges of the plate 10 are a vertical weld edge 12, a vertical outer edge 14 which includes an upper outer edge 14a collinear with a lower outer edge 14b, an upper rounded edge 16 and a lower angled edge 18. As shown in FIGS. 4-5, when viewed from the vertical outer edge (FIG. 4) or the vertical weld edge (FIG. 5), the plate 10 is flat.

Figure 1:
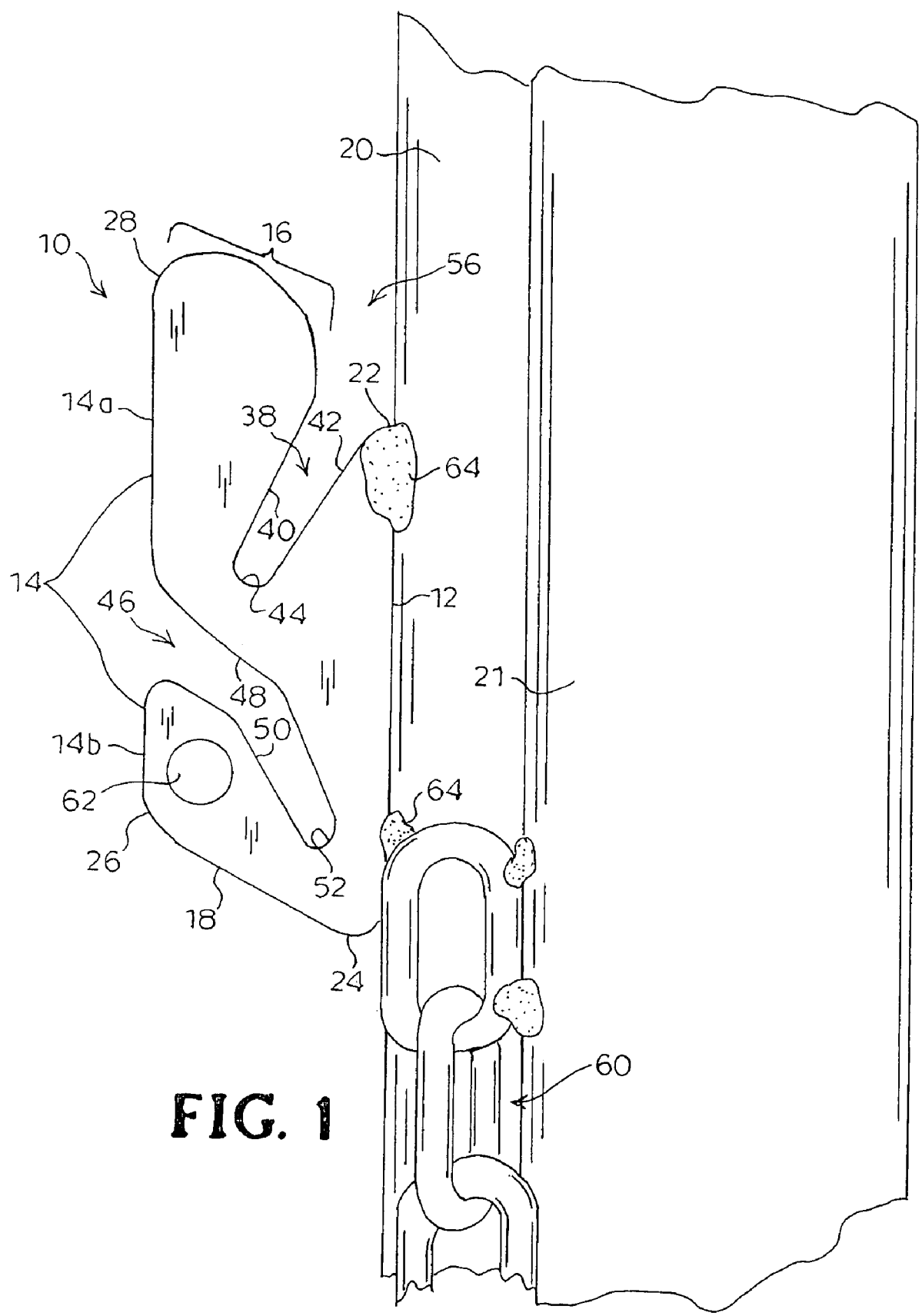
FIG. 1 a perspective view of a first side of the chain hook of the invention attached to a gate post.
Figure 2:
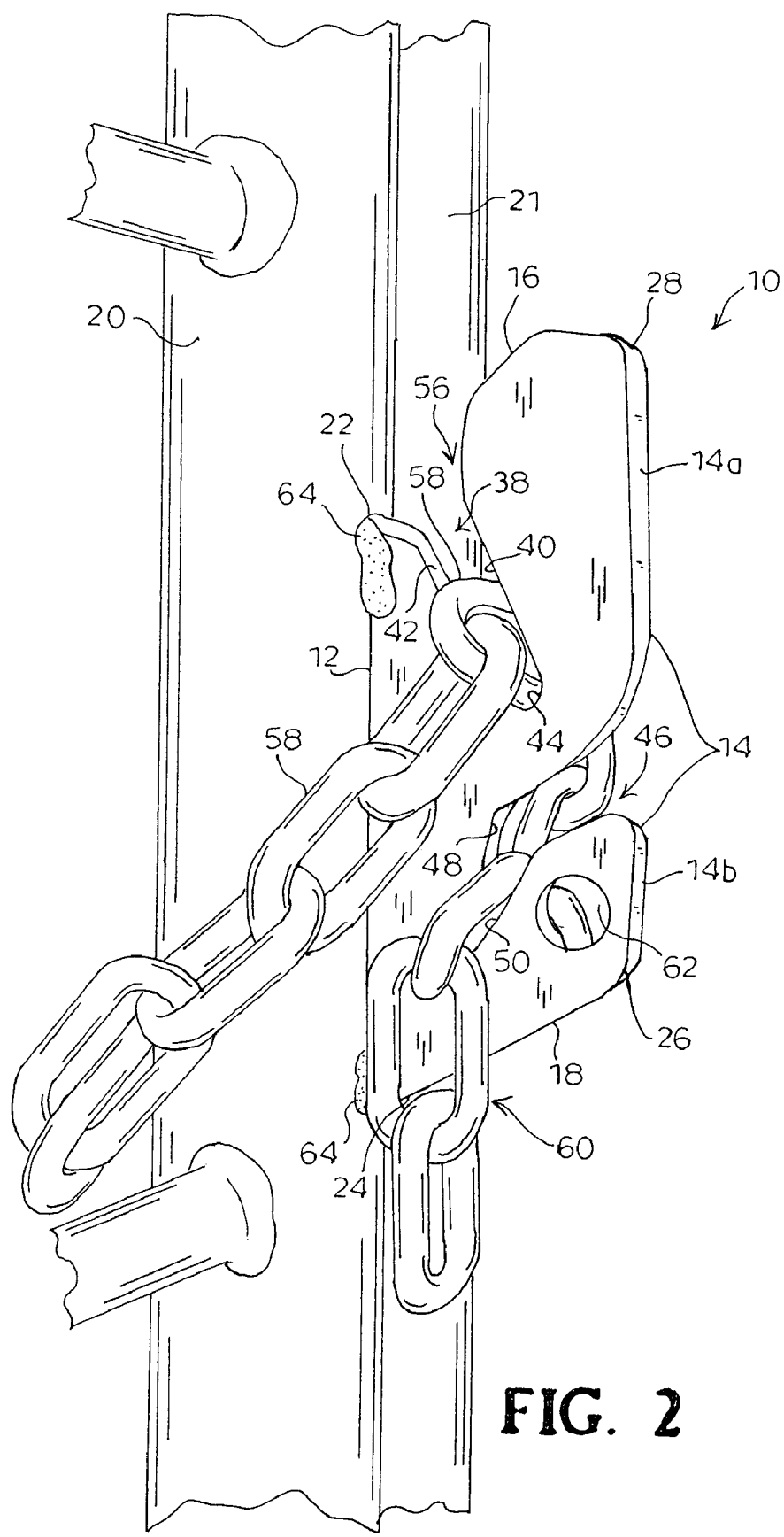
FIG. 2 is an elevational view of the second side of the chain hook of the invention attached to a gate post and having a chain placed thereon.
Figure 3:
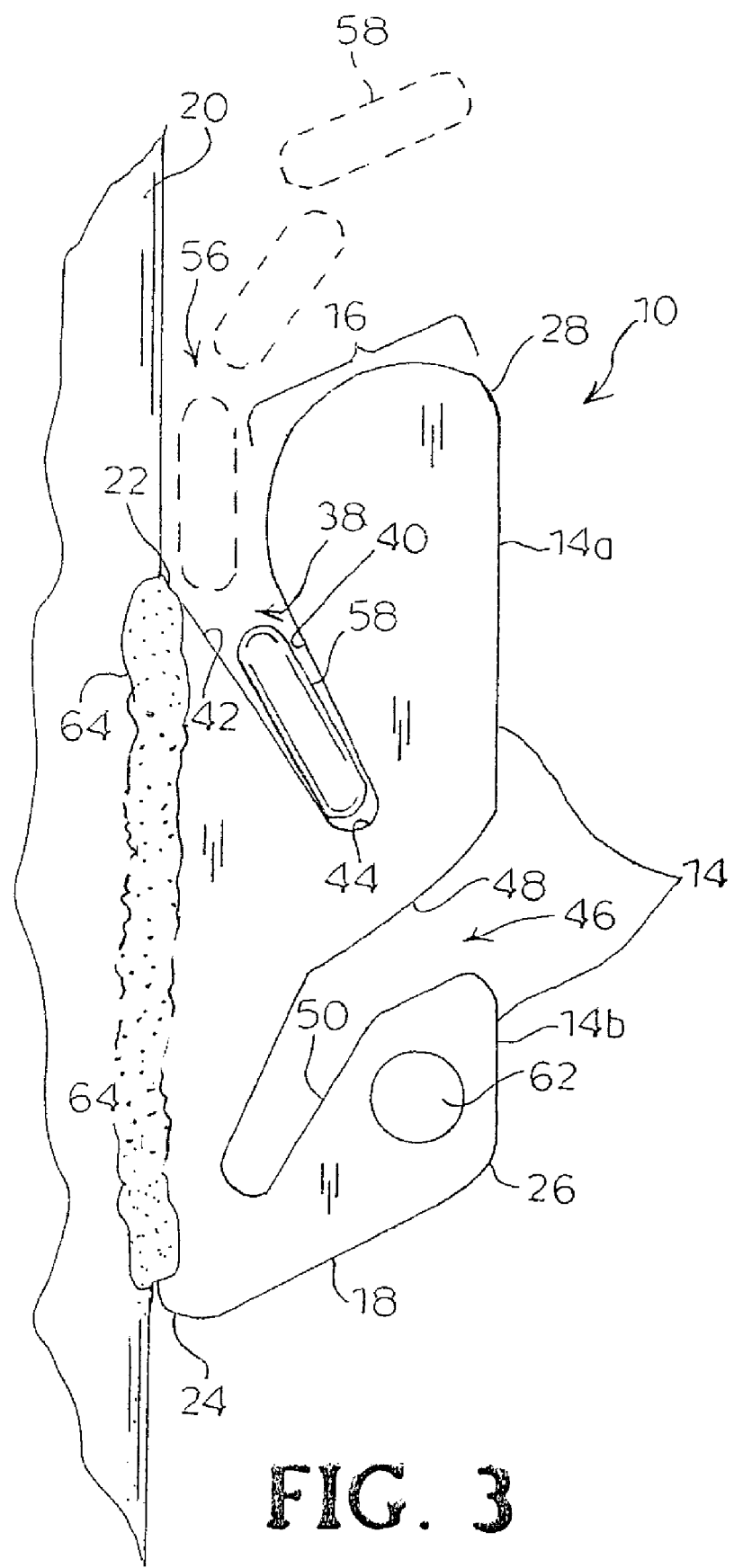
FIG. 3 is an elevational view as in FIG. 2, showing sequential positions of a chain link entering the slot in the chain hook.

The vertical weld edge 12 enables attaching the preferred embodiment of the plate 10 to a post 20 (or other mounting surface) as shown in FIGS. 1-4. This may be by welding at one or more welding areas 64 (FIG. 5). Alternatively vertical weld edge 12 may be permanently formed with a post 20 or other mounting surface (not specifically shown) but the resulting structure would be as shown herein. The vertical weld edge 12 has an upper tip 22 and a lower end 24 as shown, both of which lie along the post 20 when the plate 10 is attached to a post 20. In the preferred embodiment, the entire weld edge 12 needs to be against the post and welded 100% as shown in FIG. 3.

The vertical outer edge 14 is generally parallel to vertical weld edge 12. In the embodiment shown in FIGS. 1-2, there is a rounded corner 26 formed between lower outer vertical edge 14 and lower angled edge 18; however this transition may be differently rounded or in any other shape, so long as no protrusion is formed in this area that would undesirably snare a chain link.

Between the upper rounded edge 16 and the upper outer edge 14a is a smooth rounded outer corner 28 (FIGS. 1-2).

When the plate 10 is mounted, the plate 10 is formed so that there is an angled inner slot 38 extending diagonally downward away from the mounting surface as shown in FIGS. 1-2 between the upper rounded edge 16 and the vertical weld edge 12. The angle formed by slot 38 with the vertical is preferably about 25 to 30 degrees. This slot is formed by two parallel slot edges, outer slot edge 40 and inner slot edge 42, which are joined at their bottoms by a rounded slot bottom edge 44.

In addition, between the upper outer edge 14a and lower outer edge 14b, there is an angled outer slot 46, formed by two main linear edges: an upper first edge 48 extending inward and slightly downward for about 1½ inches, and then angling downward at about a 45-degree angle for about 1½ inches toward the lower end 24 so that there is about 3 inch between the lowest point of the upper first edge 48 and the lower end 24; and lower second edge 50, which is nearly parallel to upper first edge 48, except that it preferably gets slightly closer to upper first edge 48 at its lowest point. Between upper first edge 48 and lower second edge 50 at their lowest points is rounded inner corner 52. Rounded inner corner 52 is preferably about ½ inches from lower end 24.

The above-described structure results in formation of a two-slotted receiving area for a link of the chain when the chain hook is mounted on a post. This receiving area comprises a landing area formed by the upper rounded edge 16; a mouth 56 formed between the upper rounded edge 16 and the post 20 that at its upper end is about 1½ inches wide and at its lower end is about 1 inches wide; and the slot 38. Thus, when a chain link 58 falls into or onto the mouth 56, the chain link 58 falls into the slot 38 (FIG. 2). To more firmly hold the chain in place the chain may be looped around so that additional links are placed in angled outer slot 46 as shown in FIG. 2.

In order that a chain 60 having a chain link 58 placed in the slot 38 may be locked into position, the plate 10 has a lock hole 62 below the slot. Preferably this lock hole 62 has a diameter of about ½ in. and is about 2 inches from the vertical weld edge and about 1½ inches above the lower edge 18.

The chain hook of the invention is preferably used by someone wishing to fasten a chain thereto by placing the selected area of the chain above the chain hook and dropping the chain so that it falls into the slot as discussed above. Because of the shape and relative size of the receiving area of the mounted chain hook of the invention as compared to a chain to be used therewith, there is no need for careful positioning to get the chain in the proper holding position. Rather, a quick toss of a chain over the chain hook is sufficient to hold a chain link, and thus the entire chain, in place. Sequential locations of a chain being placed on the invention are shown in FIG. 3. Additional security is provided by looping additional links into angled outer slot 46. Placing the chain in the second slot will prevent livestock from accidentally or purposely removing the chain from the primary slot, and therefore opening the gate. For occasions where the user wishes to retain the chain so that it cannot be removed, a padlock may be used as known in the art to fasten through another link of the chain and through the lock hole 62. On other occasions, the chain may be simply lifted upward to withdraw it from the chain hook of the invention.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A chain hook for detachably holding a chain to a post, comprising a vertically disposed plate having: a vertical weld edge for attaching the plate to the post, the vertical weld edge having an upper tip; a vertical outer edge comprising an upper outer edge and a lower outer edge separated by an angled outer slot extending downward toward the post and ending at a rounded inner corner; an upper rounded edge; a lower angled edge extending between the vertical weld edge and the vertical outer edge, and an angled inner slot extending downward away from the post between the upper tip and the upper rounded edge; wherein a receiving area for a link of the chain is formed when the chain hook is mounted on the post, the receiving area comprising a landing area formed by the upper rounded edge; a mouth formed between the upper rounded edge and the post; and the angled inner slot, the mouth being wider than the angled inner slot at an upper end of the mouth, so that the chain link can drop into the angled inner slot and the chain can be looped around to be placed in the angled outer slot.

2. The chain hook of claim 1, wherein the plate has a lock hole below the angled outer slot.

\* \* \* \* \*